Sept. 14, 1937.　　　C. E. JOHNSON　　　2,092,919
ELECTRIC MOTOR DEVICE
Filed May 8, 1934
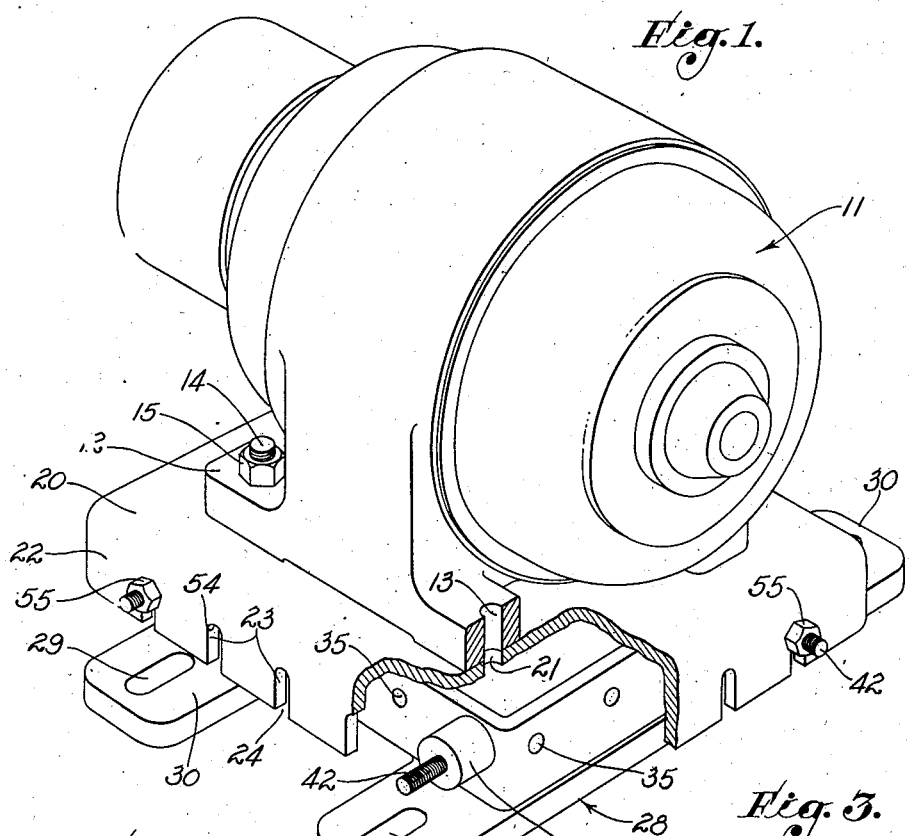
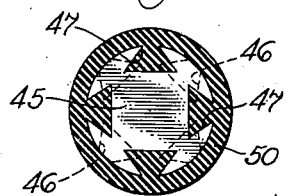
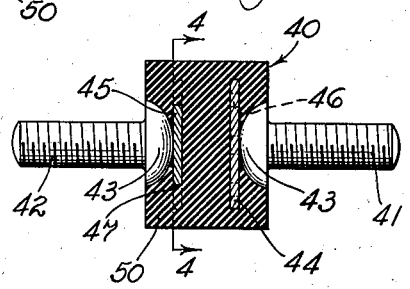
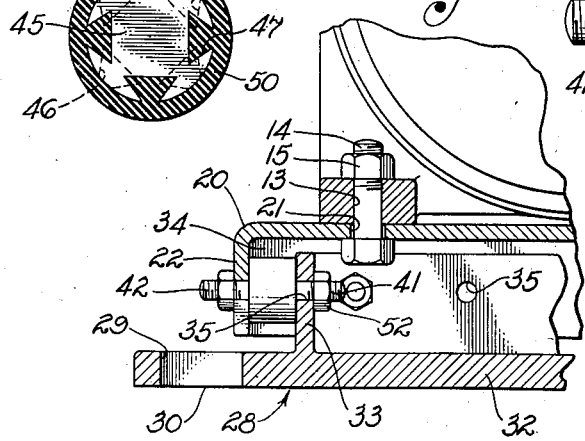
INVENTOR
CARL E. JOHNSON
BY
ATTORNEY.

Patented Sept. 14, 1937

2,092,919

UNITED STATES PATENT OFFICE 2,092,919

ELECTRIC MOTOR DEVICE

Carl E. Johnson, Pasadena, Calif.

Application May 8, 1934, Serial No. 724,509

7 Claims. (Cl. 248—22)

My invention relates to a support for a motor and more particularly to a support adapted to dampen the vibration of the motor when in operation.

It has been discovered by experience that an operating electric motor may produce a noise or hum which may be very troublesome and annoying. This noise is usually one or a combination of both of two types which may be classified as direct and indirect noises. A direct noise is one in which the vibrations are radiated directly from the motor into the air, and may be a high frequency magnetic hum or brush friction noise, or the like. An indirect noise is one which does not pass directly from the motor into the air, but is transmitted by vibration through the base of the motor into the foundation upon which the motor rests, whence it may be conducted to some remote part of the surrounding structure, causing a disagreeable resonance hum usually of low frequency.

It is an object of my invention to eliminate motor noises of the classes described, and more particularly to eliminate noises of the indirect type by dampening the vibration period of the motor upon its supporting structure. I prefer to accomplish this by providing a resilient sub-base means or structure upon which the motor may be supported. It is obvious that noises may be caused by many types of operating machinery, and although I have described my invention in connection with its use to support an electric motor, I do not wish to limit my invention thereto, but intend to include the elimination of noises from all types of machinery causing such noises by the vibration thereof.

The transmission of vibration by any particular motor depends largely upon the construction and speed of the motor, and the vibrational characteristics of the motor foundation. The latter factors are largely unknown, and it is an object of this invention to provide a motor support the dampening characteristics of which may be changed readily to dampen vibrations of various frequencies, so as to provide for changes in operating conditions, due to changes in speed of the motor, and changes in the supporting or surrounding structure.

It is a further object of this invention to provide a resilient sub-base means adapted to support a motor on its foundation in such a manner as to dampen all vibrations transmitted directly by the motor to its foundation or supporting structure.

A further object of this invention is to support a motor directly upon a plurality of resilient elements, the number, size or resilient characteristics of which may be changed readily to increase or decrease the total resiliency of the sub-base structure supporting the motor.

I have found that by using rubber or other resilient material in shear to provide the resilient or cushioning effect of my invention that the life and resiliency of the material is increased, and it is a further object of this invention to provide a resilient element including such a structure.

A further object of my invention is to provide as an article of manufacture a readily changeable resilient element of simple and efficient construction which may be used in my device to support the motor.

A still further object of my invention is to provide a sub-base structure for a motor from which the motor may readily be removed.

Further objects and advantages of this invention will be evident hereinafter.

Referring to the drawing which is only for the purpose of illustration of the preferred embodiment of my invention:

Fig. 1 is a perspective view of my invention partially broken away, showing a conventional motor unit supported thereby.

Fig. 2 is an enlarged vertical sectional view of one side of the base of the invention.

Fig. 3 is an enlarged sectional view of one of the resilient elements of the invention.

Fig. 4 is a sectional view taken on the line 4—4 of Fig. 3.

Referring to Fig. 1, I show a motor 11 of conventional design resiliently supported by my invention. The motor 11 has bosses or feet 12 formed integrally thereon provided with openings 13 adapted to receive bolts 14 having nuts 15, which are used customarily to secure the motor to any desired foundation.

I prefer to provide a base means in the form of a base 20, having vertical openings 21, which is adapted to be secured to the motor 11 by the bolts 14. The base 20 has a downwardly extending vertical lip 22 which, as shown in Figs. 1 and 2, is formed integrally with the base 20 and extends entirely around the perimeter thereof. The lip 22 is provided with a plurality of vertical slots 23 which are open at their lower ends 24. Any number of slots 23 may be provided, and the form thereof may be altered as desired. Although I prefer to provide the base 20 as a separate element which may be bolted to any conventional type of motor it is obvious that the base may be formed integrally on the motor housing instead of providing it as a separate element. Likewise, although I have shown a form of base having a downwardly depending lip 22 formed integrally thereon, it is clearly evident that the lip may be constructed as a separate element or elements which may be attached by suitable means to the base or directly to the motor without departing from the spirit of the invention.

As shown in Figs. 1 and 2 a sub-base means or structure 28 is adapted to be secured directly to the foundation upon which the motor assembly rests by suitable means (not shown) passing through slots 29 in legs 30 thereof. The slots 29 are formed in the legs 30 perpendicular to the axis of the motor 11, so that the entire motor assembly may be moved in a direction perpendicular to the motor axis to adjust the tension in the motor belt (not shown) and take up slack therein as may become necessary as a result of stretching of the belt due to wear. The sub-base 28 is formed with a flat base plate 32 which is extended at its four corners to form the legs 30, and has a vertical rim 33 of substantially the same height as the downwardly depending lip 22 and inwardly spaced therefrom by a space 34. The rim 33 is provided with a plurality of horizontal openings 35 which extend therethrough and are formed so as to be in alignment with corresponding slots 23 in the lip 22. It is to be understood that the positions of the openings 35 in the rim 33 shown in the drawing are illustrative only, and that the number or position thereof may be varied as desired.

Associated with the sub-base 28 I provide resilient means upon which the base 20 is adapted to be supported. The resilient means may be of any construction suitable to support the base 20 upon the sub-base 28 although I prefer to use for this purpose a plurality of resilient elements 40 of similar construction, such as are shown in Figs. 3 and 4.

The resilient elements 40 each have a pair of threaded bolt members 41 and 42 having substantially the same longitudinal axis and having inner ends 43 to which are secured respectively washer members 44 and 45 by any suitable means, preferably by spot welding. The washer members 44 and 45 are provided respectively with a plurality of wedge-shaped openings 46 and 47 therethrough, each of said openings having the base of the wedge formed thereby positioned relatively near to the center of the washer and having a relatively narrow mouth through the circumference of the washer, the openings 47 of the left hand washer 45 being staggered with relation to the openings 46 shown in dotted lines on the right hand washer 44. The inner ends 43 and the washers 44 and 45 are embedded in a cylindrical shaped mass of resilient material forming a resilient portion 50 which holds the bolts together and provides a resilient medium therebetween. I prefer to use rubber for the resilient material although other kinds of resilient materials might be substituted without departing from the spirit of my invention. As shown in Fig. 3, the resilient portion 50 penetrates the wedge-shaped openings 46 and 47 in the washers 44 and 45 and is securely locked therein by the walls of the opening to furnish added strength to the structure and to increase the bond between the bolts 41 and 42, and by forming the resilient element 40 with the openings 46 and 47 in staggered relation the strength of the resilient element is further increased. It is obvious that the resilient elements 40 may be made of different sizes and with rubber or other resilient material having different degrees of resiliency so as to provide any desired degree of total resiliency for the support of the base 20 as described hereinafter.

In assembling my device, each of the resilient elements 40 is attached to the rim 33 by passing the bolt 41 through one of the openings 35, and a nut 52 is threaded onto the inner end of the bolt to lock the resilient element to the rim, as shown in Fig. 2. Ordinarily, I prefer to utilize at least four of the resilient elements 40 on the rim 33 by placing each of them adjacent to one of the corners of the rim so as to distribute the weight of the motor equally thereon. Additional resilient elements 40 may be added as desired to change the total resiliency of all of the elements combined. Where a relatively heavy motor 11 is being used it may be desirable to utilize most, or all, of the resilient elements 40 which are available or to substitute ones having a different degree of resiliency.

In some installations it has been found preferable to utilize the resilient elements 40 only in planes parallel to the axis of the shaft of the motor 11, while in others it may be desirable to use the elements only in planes perpendicular to the axis. Although the disposition of the resilient elements 40 depends largely upon the vibrational characteristics of any particular motor employed, I have found that in most motor assemblies the motor vibrates in a direction perpendicular to the axis thereof, and that, since the resilient elements are most efficient when acting in shear, the best results may generally be obtained by positioning the elements in planes perpendicular to the axis of the motor shaft.

Continuing with the assembly of the structure, the base 20 with the motor 11 attached thereto by means of bolts 14 is then lowered into supported position by permitting the outwardly projecting bolts 42 to enter the openings 24 of the slots 23 until the bolts contact the upper ends 54 of the slots, at which time the base will be entirely supported upon the resilient elements and may be locked thereto by means of nuts 55 threaded thereon. As shown in Fig. 2, when the base 20 is supported on the resilient elements 40 the space between the lip 22 and the rim 33 will be but slightly greater than the length of the portion 50 of the resilient elements so as to provide a snug fit therebetween to prevent any uncushioned horizontal movement of the base 20 relative to the sub-base 28. The vertical cushioning effect of the resilient elements 40 is provided by the shearing action on the resilient material caused by the full weight of the motor 11 being supported thereon, and a horizontal cushioning effect is provided by the compressibility and expandability of the material in the portion 50 as well as by the shearing action of the elements. The action in shear of the elements 40 is an important feature of my invention in that it adds greatly to the resilient action of the elements and increases the life of the resilient material used therein.

When my invention is assembled as shown in Fig. 1, any vibration caused by the operation of the motor 11 and transmitted to the base 20 therefrom will be directly dampened and eliminated by the resilient cushioning effect of the elements 40. By increasing or decreasing the number of resilient elements 40 employed in any particular installation, or by substituting therefor other elements having different degrees of resiliency, practically any cushioning effect desired may be secured and consequently any particular vibration frequency may be dampened by my device. By simply loosening the nuts 55 the base 20 may be lifted clear of the sub-base 28 to permit any of the elements 40 to be detached or others substituted therefor, and this ready interchangeability and detachability of the resilient elements is also an important feature of my invention.

Although I have shown and illustrated the preferred embodiment of the invention I do not intend to be limited thereto, it being obvious that the structure or the construction of the elements may be materially altered without departing from the spirit of my invention.

I claim as my invention:

1. In an electric motor device of the character described, the combination of: horizontal base means; a lip associated with said base means and downwardly depending therefrom, said lip having a slot therein open at one end; sub-base means including a projection thereon positioned adjacent said lip; and resilient means associated with said projection on said sub-base means and adapted to enter said slot through said open end to resiliently support said base means.

2. In an electric motor device of the character described, the combination of: horizontal base means; a vertical lip associated with said base means and downwardly depending therefrom, said lip having a plurality of slots therein, each of said slots having an open end; sub-base means; and a plurality of resilient elements associated with said sub-base means and readily detachable therefrom, each of said elements being so disposed that it can enter one of said slots through said open end thereof to resiliently support said base means.

3. As an article of manufacture, a resilient element comprised of a pair of bolt members having inner ends spaced apart but adjacent each other, a washer member secured to each of said inner ends and having wedge-shaped openings therethrough, and a resilient material surrounding said washers and said inner ends to resiliently attach said bolt members together, said resilient material filling said openings.

4. As an article of manufacture, a resilient element comprised of a pair of bolt members having inner ends spaced apart but adjacent each other, a washer member spot-welded to each of said inner ends and having wedge-shaped openings therethrough, the openings of one of said washers being staggered in relation to the openings of the other of said washers, and a resilient material entirely surrounding said washers and said inner ends to resiliently attach said bolt members together, said resilient material filling said openings.

5. As an article of manufacture, a resilient element comprised of a pair of bolt members having inner ends spaced apart but adjacent each other, said bolt members having substantially the same longitudinal axis, a washer member secured to each of said inner ends and having a plurality of wedge-shaped openings therethrough, the openings of one of said washers being staggered in relation to the openings of the other of said washers, said washers and said inner ends being embedded in a resilient material adapted to resiliently attach said bolt members together, said resilient material filling said openings.

6. In a machinery support, the combination of: a horizontal base means adapted to provide a supporting structure for an article of machinery adapted to vibrate due to its operation predominantly in a horizontal plane and in a known direction; a lip associated with said base means and downwardly depending therefrom, said lip having a plurality of vertical slots therein, each of said slots having an open end; a sub-base means including a vertical wall adapted to be parallel to and spaced from said lip, said sub-base means being adapted to be readily secured to a supporting structure therefor; a plurality of readily interchangeable resilient elements associated with said sub-base means and readily detachable therefrom, said resilient elements being disposed in planes parallel to the direction of said vibrations so as to act in shear to dampen said vibrations, each of said resilient elements being so disposed that it can enter one of said slots through said open end thereof in the space between said lip and said wall to resiliently support said base means; and means for locking said base means to said resilient elements.

7. A support for a dynamo-electric machine having a rotating shaft, including: base means adapted to support said dynamo-electric machine, including a pair of lips at each end thereof positioned transversely with respect to said shaft; sub-base means adapted to be attached to a supporting structure, said sub-base means including a projecting element at each end thereof adapted to be positioned adjacent one of said lips; and a plurality of resilient elements disposed between said lips and said projecting elements so as to dampen vibrations of said dynamo-electric machine in a direction perpendicular to said shaft.

CARL E. JOHNSON.